United States Patent [19]
Kifer

[11] Patent Number: 5,863,092
[45] Date of Patent: *Jan. 26, 1999

[54] BUCKET SEAT MOUNTED APPARATUS FOR HANGING ARTICLES

[75] Inventor: Harlan E. Kifer, Bloomfield Hills, Mich.

[73] Assignee: Chrysler Corporation, Auburn Hills, Mich.

[*] Notice: The term of this patent shall not extend beyond the expiration date of Pat. No. 5,415,457.

[21] Appl. No.: 668,961

[22] Filed: Jun. 24, 1996

[51] Int. Cl.⁶ ..................................... A47C 7/62
[52] U.S. Cl. ................ 297/188.04; 297/188.01; 297/188.06; 297/452.18; 297/452.2; 248/309.1; 211/12
[58] Field of Search .......... 297/188.04, 188.06, 297/188.01, 452.18, 452.2; 248/309.1; 211/12; 224/275; D12/416

[56] References Cited

U.S. PATENT DOCUMENTS

| | | |
|---|---|---|
| 94,448 | 8/1869 | Simonson . |
| 344,555 | 6/1886 | Wood . |
| 462,723 | 11/1891 | Morss . |
| 1,656,339 | 1/1928 | Runyan . |
| 1,665,352 | 4/1928 | Gibbs ................................ 297/452.18 |
| 2,582,650 | 1/1952 | Patton ................................ 224/42.45 |
| 2,680,523 | 6/1954 | Heeter ...................................... 108/44 |
| 2,687,336 | 8/1954 | Smith et al. ........................ 108/44 X |
| 3,044,828 | 7/1962 | Fowler ..................................... 297/191 |
| 3,333,890 | 8/1967 | Whitwam ............................... 297/191 |
| 3,335,679 | 8/1967 | Bown ........................................ 108/44 |
| 3,479,085 | 11/1969 | Weinstein ...................... 297/188.06 X |
| 3,625,161 | 12/1971 | Rosner .................................... 108/44 |
| 4,519,648 | 5/1985 | Jovanovic ............................... 297/146 |
| 4,519,650 | 5/1985 | Terada et al. .................... 297/452.2 X |
| 4,595,238 | 6/1986 | Göldner ............................ 297/452.18 |
| 4,695,097 | 9/1987 | Muraishi ........................... 297/452.18 |
| 4,711,488 | 12/1987 | Ohanessian ............................ 297/190 |
| 4,836,602 | 6/1989 | d'Almada Remedios et al. .... 297/191 |
| 4,896,919 | 1/1990 | Muraishi et al. .............. 297/188.06 X |
| 5,004,295 | 4/1991 | Inoue ..................................... 297/191 |
| 5,046,433 | 9/1991 | Kramer et al. .......................... 708/44 |
| 5,104,083 | 4/1992 | Shannon ................................. 248/339 |
| 5,269,229 | 12/1993 | Akapatangkul .......................... 108/44 |
| 5,295,732 | 3/1994 | Boisset .......................... 297/188.04 X |
| 5,415,457 | 5/1995 | Kifer ................................ 297/188.04 |
| 5,511,493 | 4/1996 | Kanehl, Jr. .............................. 108/44 |
| 5,678,741 | 10/1997 | Schieber .............................. 108/44 X |
| 5,681,080 | 10/1997 | Pond et al. ..................... 297/188.04 X |

FOREIGN PATENT DOCUMENTS 203201  11/1986  European Pat. Off. ................. 108/44

*Primary Examiner*—Peter M. Cuomo
*Assistant Examiner*—Rodney B. White
*Attorney, Agent, or Firm*—Thomas G. Pasternak

[57] ABSTRACT

A bucket seat comprising an apparatus for hanging articles comprising a hanger base mounted to a plurality of structural columns of said seat via a cross member passing through a sleeve defined by the hanger base and a plurality of openings in the hanger base defining projections for hanging articles.

9 Claims, 2 Drawing Sheets

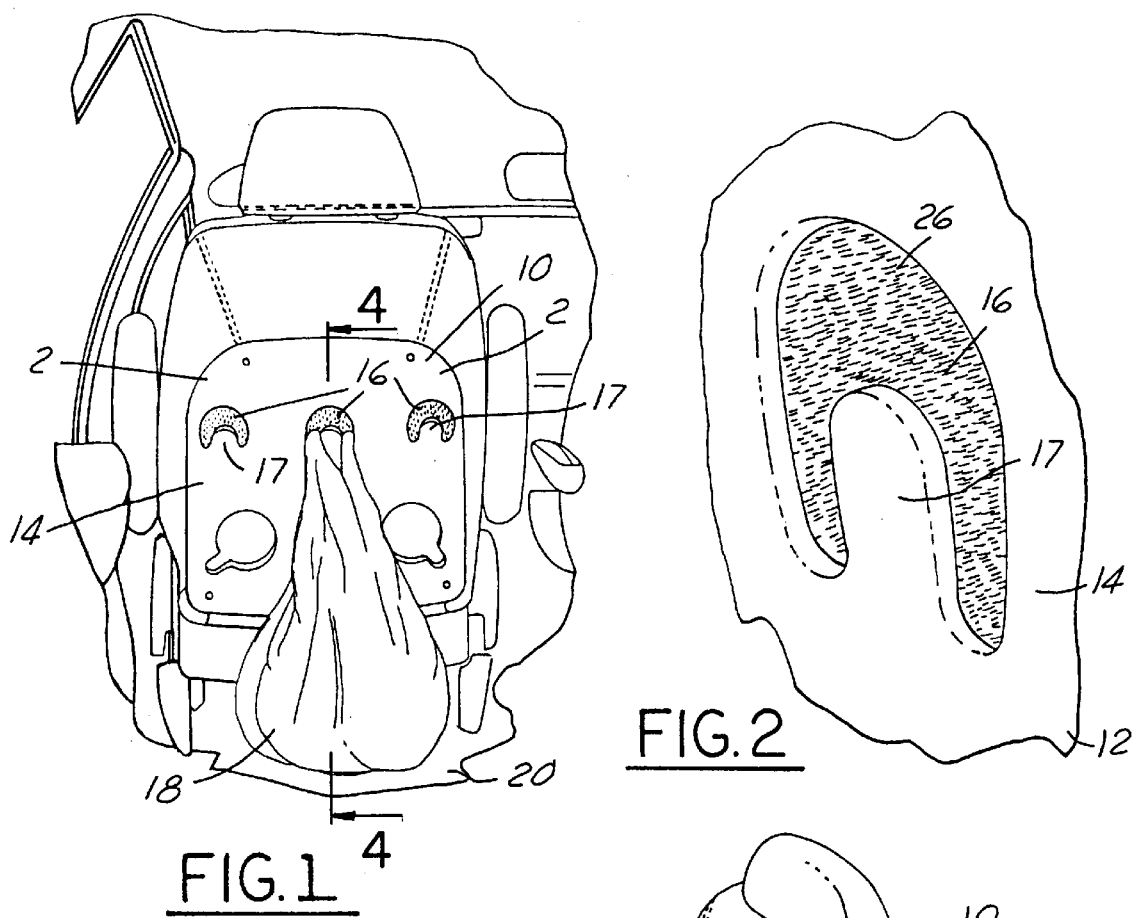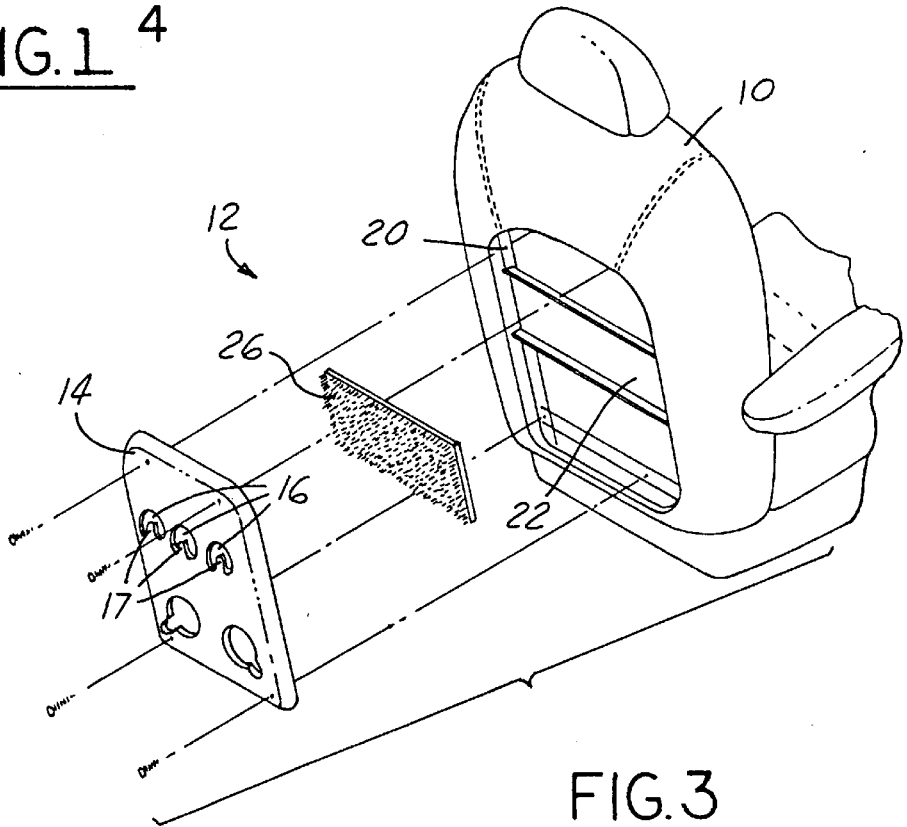

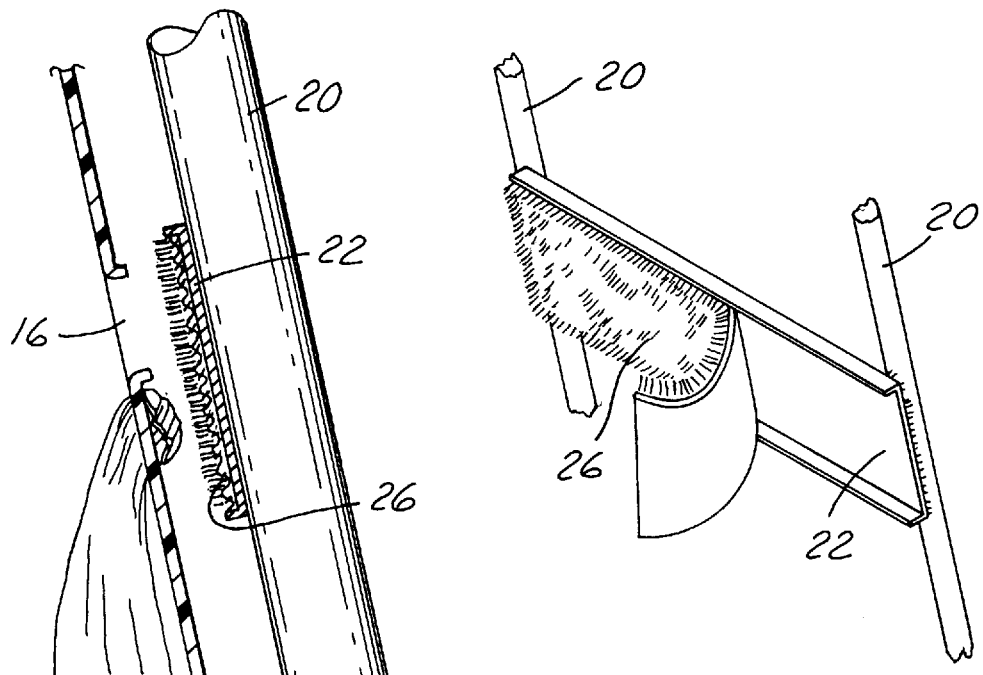
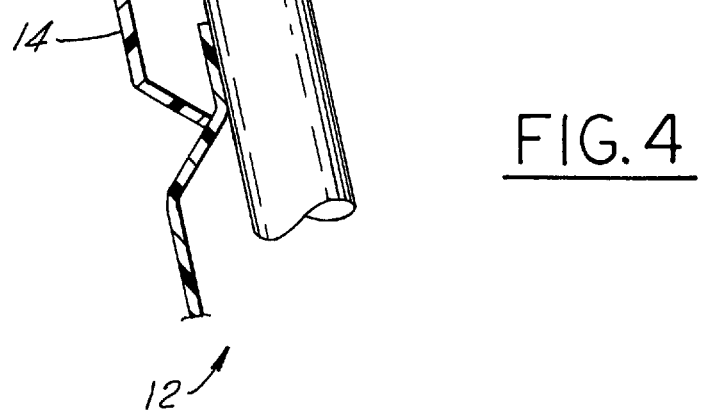
FIG. 5
FIG. 4

BUCKET SEAT MOUNTED APPARATUS FOR HANGING ARTICLES

BACKGROUND OF THE INVENTION

1. Field of the Invention

This invention relates generally to accessories for vehicles, and, more particularly, to an article carrier mounted on the back of a bucket seat of a vehicle.

2. Description of the Related Art

Known attachments for mounting on the backs of seats include a triple opening type pocket, Inoue U.S. Pat. No. 5,004,295; a holder assembly in a recessed area in the back of a passenger seat, Remedios et al U.S. Pat. No. 4,836,602; a garment hanger, Ohanessian U.S. Pat. No. 4,711,488; a slip cover type of article carrier, Weinstein U.S. Pat. No. 3,479,085; a mounting panel with upwardly and rearwardly inclined arms, Fowler U.S. Pat. No. 3,044,828, a kit with stiffening rod, Runyan U.S. Pat. No. 1,656,339; a package holder, Morss U.S. Ser. No. 462,723; a hat holder, Wood U.S. Ser. No. 344,555; a web of netting, Simonson U.S. Ser. No. 94,448; and an item supporting attachment on a vehicle seat back, Kifer U.S. Pat. No. 5,415,457.

SUMMARY OF THE INVENTION

A general object of the invention is to provide an improved article carrier mounted on the back of a bucket seat of a vehicle.

Another object of the invention is to provide a bucket seat back mounted article carrier for supporting containers with handles thereon, such as filled plastic shopping bags.

These and other objects and advantages of the invention will become more apparent when reference is made to the following drawings and the accompanying description.

DESCRIPTION OF THE DRAWINGS

FIG. 1 is a perspective fragmentary view of the back of a bucket vehicle seat embodying the invention;

FIG. 2 is a detailed view of a portion of FIG. 1;

FIG. 3 is an exploded view of the present invention;

FIG. 4 is an enlarged cross-sectional view taken along the plane of the line 4—4 of FIG. 3, and looking in the direction of the arrows;

FIG. 5 a perspective view of a partial assembly of the present invention.

DETAILED DESCRIPTION OF THE INVENTION

Referring now to the drawings, FIG. 1 and FIG. 2 illustrate generally a bucket seat back 10 on which the bucket seat mounted apparatus of the present invention is mounted. Bucket seat mounted apparatus 12 comprises hanger base 14 defining a plurality of openings 16 which in the preferred embodiment comprise inverted U-shaped cutouts through the hangar base which define projections 17 for hanging articles such as plastic shopping bags 18 thereon above a vehicle floor 20. Any suitable opening or hanging means may be used, however. In the preferred embodiment hangar base 14 comprises a one piece molded plastic part for ease of manufacture.

As shown more specifically in FIGS. 3, 4 and 5, hanger base 14 is mounted to two parallel structural support columns 20 of bucket seat 10. These columns are part of the existing structure of the bucket seat, and the present invention may be mounted to other existing structures as applicable. Cross member 22 passes through sleeve 24 defined by and passing through hanger base 14 so that tabs 28 project out from either end of the sleeve to allow connection of the cross member to the columns of the seat, preferably by spot-welding, thereby securing the hanger base to the back of the bucket seat. In the embodiment shown sleeve lies under two of the plurality of openings 16 and cross member 22 is covered on the side that can be seen through the cutouts with carpet 26 to present a pleasing appearance when viewed through openings 16.

Turning to FIG. 6 and FIG. 7, hanger base 12 is seen from back and in cross section to show the arrangement of cross member 22 in sleeve 24.

While but one embodiment of the invention has been shown and described, other modifications thereof are possible within the scope of the following claims.

I claim:

1. A bucket seat mounted apparatus for hanging articles comprising:

a one-piece molded hanger base;

means for hanging articles connected to said hanger base;

said hanger base mounted to the back of said seat via a fixed connection to structural columns of said seat.

2. A bucket seat mounted apparatus for hanging articles comprising:

a one-piece moldes hanger base;

means for hanging articles connected to said hanger base;

said hanger base mounted to the back of said seat via a cross member passing through a sleeve defined by said hanger base.

3. A bucket seat mounted apparatus for hanging articles comprising:

a hanger base; said hanger base mounted to a plurality of structural columns of said bucket seat via a cross member passing through a sleeve defined by said hanger base;

means for hanging articles connected to said hanger base.

4. The apparatus of claim 3 wherein said means comprises a plurality of openings defined by said hanger base, said openings defining projections.

5. The apparatus of claim 3 wherein said hanger base is a one piece molded piece.

6. A bucket seat comprising an apparatus for hanging articles comprising:

a one-piece molded hanger base;

means for hanging articles connected to said hanger base;

said hanger base mounted to the back of said seat via a fixed connection to structural columns of said seat.

7. A bucket seat comprising an apparatus for hanging articles comprising:

a hanger base;

means for hanging articles connected to said hanger base;

said hanger base mounted to the back of said seat via a cross member passing through a sleeve defined by said hanger base.

8. A bucket seat comprising an apparatus for hanging articles comprising:

a hanger base; said hanger base mounted to a plurality of structural columns of said seat via a cross member passing through a sleeve defined by said hanger base; and means for hanging articles connected to said hanger base.

9. The seat of claim 8 wherein said means comprises a plurality of openings defined by said hanger base, said openings defining projections.

* * * * *